United States Patent
Spiekermeier et al.

(10) Patent No.: US 7,641,929 B2
(45) Date of Patent: Jan. 5, 2010

(54) METHOD AND DEVICE FOR ADJUSTING THE SEDIMENT CONTENT OF A DRINK

(75) Inventors: Bernd Spiekermeier, Oelde (DE); Carsten Waubke, Oelde (DE)

(73) Assignee: Westfalia Separator AG, Oelde (DE)

( * ) Notice: Subject to any disclaimer, the term of this patent is extended or adjusted under 35 U.S.C. 154(b) by 608 days.

(21) Appl. No.: 10/556,041

(22) PCT Filed: Jul. 9, 2004

(86) PCT No.: PCT/EP2004/007543

§ 371 (c)(1), (2), (4) Date: Nov. 8, 2005

(87) PCT Pub. No.: WO2005/014772

PCT Pub. Date: Feb. 17, 2005

(65) Prior Publication Data

US 2006/0286206 A1 Dec. 21, 2006

(30) Foreign Application Priority Data

Jul. 30, 2003 (DE) .................. 103 35 191

(51) Int. Cl.
*C12C 12/00* (2006.01)
(52) U.S. Cl. .............. 426/495; 426/592; 210/784; 210/787; 210/790
(58) Field of Classification Search .......... 426/590, 426/592, 599, 478, 490, 495; 210/781, 784, 210/787, 790
See application file for complete search history.

(56) References Cited

U.S. PATENT DOCUMENTS

| 2,510,498 | A | * | 6/1950 | Gaeng | 426/312 |
|---|---|---|---|---|---|
| 3,128,188 | A | * | 4/1964 | McIntire | 426/384 |
| 5,160,633 | A | * | 11/1992 | Hong et al. | 210/739 |
| 5,384,141 | A | * | 1/1995 | Dyks et al. | 426/478 |
| 5,962,045 | A | | 10/1999 | Rübelmann et al. | |
| 5,965,177 | A | * | 10/1999 | Lashkajani | 426/51 |
| 6,506,427 | B1 | * | 1/2003 | Garti et al. | 426/51 |
| 6,623,417 | B1 | | 9/2003 | Zettier | |
| 2002/0155211 | A1 | * | 10/2002 | Yokoo et al. | 426/599 |
| 2004/0035296 | A1 | | 2/2004 | Schauz et al. | |
| 2004/0208966 | A1 | * | 10/2004 | Muralidhara et al. | 426/422 |

FOREIGN PATENT DOCUMENTS

| CN | 1283675 A | * | 2/2001 |
|---|---|---|---|
| DE | 42 42 526 C1 | | 2/1994 |
| DE | 195 26 005 C1 | | 5/1996 |
| DE | 199 00 667 A1 | | 7/2000 |
| GB | 991500 | | 5/1965 |
| WO | WO 92/03067 | | 3/1992 |
| WO | WO 01/57177 A1 | | 8/2001 |

* cited by examiner

*Primary Examiner*—Drew E Becker
(74) *Attorney, Agent, or Firm*—Barnes & Thornburg LLP

(57) ABSTRACT

A method of adjusting a sediment content of a drink by a centrifuge. The method includes the steps of feeding a starting product into a centrifugal drum, clarifying the starting product by a clarification process of sediment substances into a clear phase, a solids phase and a finely cloudy phase, and discharging the clear phase, the solids phase and the finely clouded phase from the centrifugal drum. Also disclosed is a centrifuge for adjusting a sediment content of a drink.

10 Claims, 1 Drawing Sheet

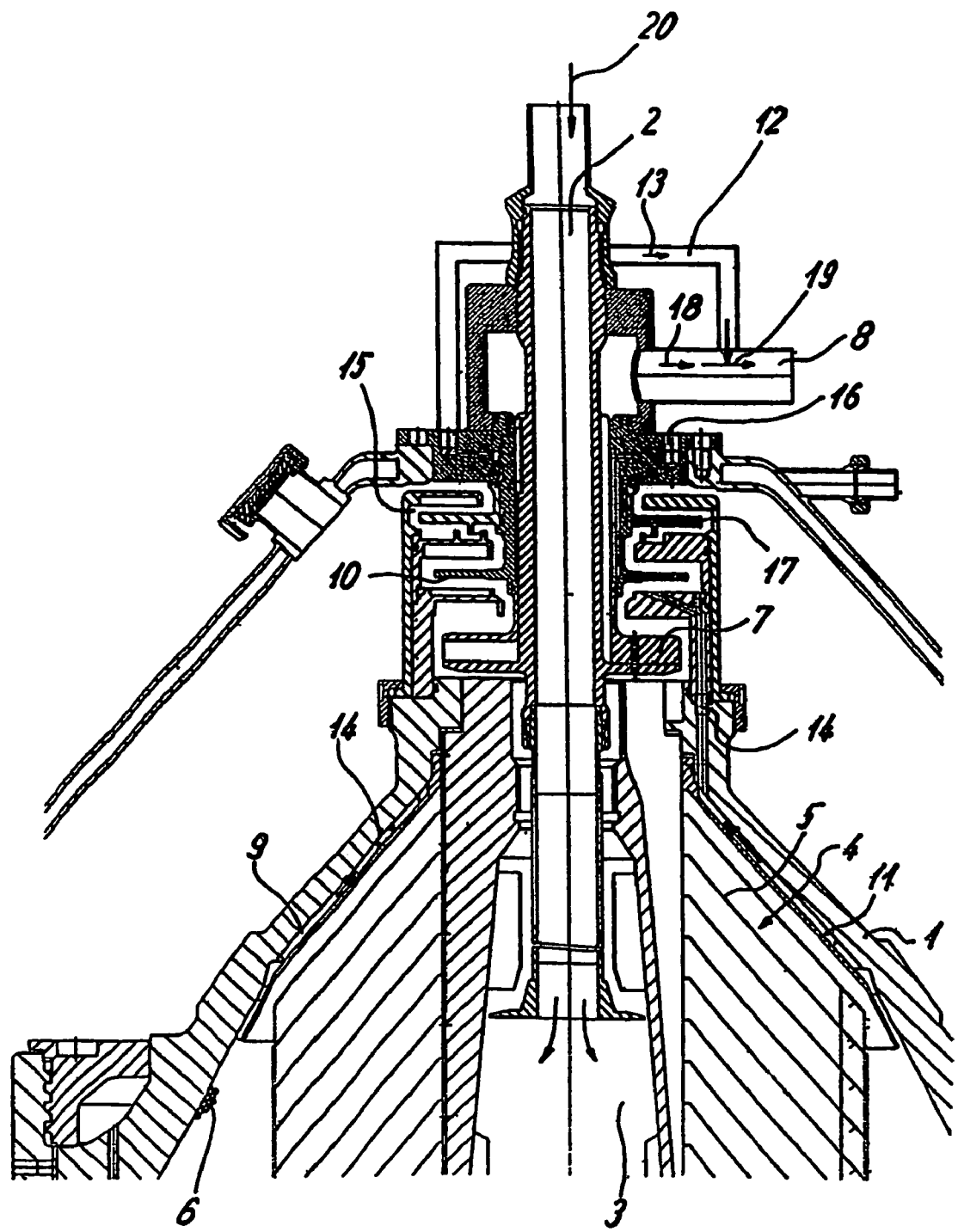

METHOD AND DEVICE FOR ADJUSTING THE SEDIMENT CONTENT OF A DRINK

BACKGROUND AND SUMMARY

The present disclosure relates to a method and a device for adjusting the sediment content of a drink.

When producing a drink, particularly beer, it is known to adjust the sediment content of the drink by clarifying the drink especially of sediments, such as proteins, by one or more parallel and/or series-connected centrifuges, particularly disk centrifuges or separators (German Patent Document DE 195 26 005 C1). In particular, a disk separator is preferably used as the last centrifuge of the clarification process.

As a result of the high rotational speeds in the overcritical operation of the disk separator, a degree of clarification is often even reached which is too high because, particularly in the case of slightly cloudy drinks, such as certain types of beer, it is often definitely desirable that a defined fraction of generally floating sediments remain in the beverage. Particularly with respect to beer, it is important for reasons of taste that extremely fine particles are kept in a floating condition.

Although for reducing the degree of clarification, the rotational speed of the disk centrifuge could be reduced, this has the problem that, under certain circumstances, the disk centrifuge is operated in critical rotational speed ranges (resonance ranges) and that a capacity-related overstressing of the disk stack occurs.

A selection by adapting the capacity of the admission is also difficult and results not only in controlling and regulating problems but, as a rule, also in a capacity-related overstressing of the disk stack.

From British Patent Document GB 991 500, a centrifuge is known which separates a liquid into three fractions and mixes two of the three fractions together again (see Page 3, starting in Line 33 of this document).

The present disclosure addresses the above-mentioned problems and disclosures by providing for a method of adjusting the sediment content of a drink and by providing for a centrifuge, which may be a disk separator, to implement the method.

The method of adjusting a defined sediment content of a drink, for example, of juice or beer, by a centrifuge, for example, a disk separator, comprises the following steps:

a starting product to be processed is fed into a centrifugal bowl of a centrifugal or separator drum in which the starting product is subjected to a clarification process of sediment substances into a clear phase and a solids phase;

the clear phase and the solids phase are discharged from the centrifugal drum; and in addition to the solids phase and the clear phase, a fine cloudy phase is tapped off and added to the clear phase after discharge from the centrifuge bowl.

By this method, the centrifuge, or disk separator, can be operated overcritically at maximum rotational speeds because, as a result of the addition of a certain quantity of the finely cloudy phase, the sediment content can be "raised" to a desirable degree, even if the sediment content had previously been reduced too much. A change of the admission quantity of the starting product is not required. In particular, this method offers improvements in comparison to, for example, a simple addition of unprocessed beer to a beer drink, because particles added here are too large. The present method basically is a clarification method for clarifying a drink, particularly a beer, such as, a yeast-type weissbier, or a juice. A clarification of sediments takes place, with an additional removal and return of a smaller quantity of the slightly or finely cloudier phase into the clear phase.

In the case of producing beer, the starting product will expediently be a preclarified beer, for example, a weissbier, and the finely cloudy phase is a finely cloudy beer, for example, a finely cloudy weissbier, which is completely added again to the clarified beer, which represents the clear phase. Solids can be removed in different fashions, for example, by piston slide valves, nozzles or the like.

The clear phase and the finely cloudy phase are expediently tapped at different diameters of the centrifuge bowl and are discharged from the centrifugal drum by different centripetal pumps.

For obtaining a defined sediment content, it is important that the quantity of the finely cloudy phase added to the clear phase can be controlled or regulated. The discharge of the usually smaller amount of the finely cloudy phase takes place by at least one throttling point which is connected in front of the centripetal pump for discharging the finely cloudy phase and which is constructed as an adjustable and/or exchangeable nozzle which can be adapted to desired conditions.

It was found to be expedient for the withdrawal of the finely cloudy phase to take place at or close to the outside diameter of a disk stack in the centrifugal drum.

The present disclosure also provides a separator for carrying out the method. The separator comprises a centrifugal drum having an inlet, a first centripetal pump for the tapping of a clear phase, and a second centripetal pump for the tapping of a finely cloudy phase from the centrifugal drum. Also included is a product outlet pipe of the second centripetal pump directly leading into the product outlet pipe of the first centripetal pump.

A device, such as an adjustable nozzle, may also be included for adjusting the volume flow into the second centripetal pump and may also be connected in front of the second centripetal pump for the tapping of the finely cloudy phase.

Other aspects of the present disclosure will become apparent from the following descriptions when considered in conjunction with the accompanying drawings.

BRIEF DESCRIPTION OF THE DRAWINGS

The FIGURE is a sectional view of a part of a separator for adjusting a defined sediment content of a drink, according to the present disclosure.

The FIGURE shows a centrifugal or separator drum 1 having an inlet 2. The centrifugal drum 1 also includes a distributor 3 through which a starting product 20 to be processed, is guided into a centrifuge bowl 4 of the separator drum 1. The starting product 20 may be, for example, a beer having a low yeast cell number preseparated by decanters or other separators (not shown) and connected on an input side of the centrifugal bowl 4 of the centrifugal drum 1.

The centrifuge bowl 4 includes a disk stack 5. The starting product 20 is clarified with respect to coarse solids, particularly sediments 6, such as solids or particles and dirt, which are removed, predominantly, by solids discharge openings or nozzles (not shown) at an outside diameter of the separator drum 1.

A clear phase 18, or the clarified drink, is drawn off at an inside diameter by a first centripetal pump 7 and is removed through a product outlet pipe 8 connected on an output side from the separator drum 1.

In the area of the outside diameter of the disk stack 5, which may be close to radially outside an outer circumference of the disk stack 5, a finely cloudy phase 13 for example, an unclarified or less clarified beer phase is fed, on a larger outside diameter than the clear phase 18, through one or more pipes above a separating plate 11. The unclarified or less clarified beer phase is fed to and through another, or second, centripetal pump 10. Centripetal pump 10 is arranged above the first centripetal pump 7. From the centripetal pump 10, the finely cloudy phase 13 is discharged through product outlet pipe 12 which leads into the product outlet pipe 8 for discharging the clear or clarified phase 18. In this manner, after passing through the separator drum 1, a defined volume flow of the finely cloudy phase 13 is again admixed to the clear phase 18.

One or more throttling points, in the form of adjustable or changeable nozzles 14, may be situated at different points in a pipe 9 to the second centripetal pump 10. This permits an adjustment, which may also be carried out only once, of the volume flow of the finely cloudy phase 13 which is admixed to the clear phase 18 in order to obtain a clarified drink 19 with a defined sediment content.

Optionally, a valve (not shown) can be connected into the product outlet pipe 12 for discharging the finely cloudy phase 13 in order to interrupt the volume flow.

The above-described arrangement permits the uncritical operation of the separator drum 1 at a very high rotational speed without obtaining an undesirably low sediment content in the clarified drink 19.

The volume flow of the finely cloudy phase 13 can be controlled or regulated by a measurement of the sediment after the admixing or a measurement of the sediment in the concentrate pipe 9 itself.

Above the second centripetal pump 10, also called concentrate gripper, a hydrohermetic blocking chamber 15 may be constructed to which degassed sterile water can be fed through a blocking chamber inlet 16 and a blocking disk 17 in order to avoid an oxygen intake on the second centripetal disk 10.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

The invention claimed is:

1. A method of adjusting a sediment content of a drink by a centrifuge, comprising the steps of:
    feeding a starting product into a centrifugal drum having a centrifugal bowl;
    clarifying the starting product by a clarification process of sediment substances into a clear phase, a solids phase and a finely cloudy phase;
    discharging the clear phase, the solids phase and the finely clouded phase from the centrifugal drum; and
    the finely cloudy phase is tapped after discharge from the centrifugal bowl and added to the clear phase, thereby producing the drink having an adjusted sediment content.

2. The method according to claim 1, wherein the clear phase and the finely cloudy phase are tapped at different diameters of the centrifuge bowl and are discharged from the centrifugal drum by different centripetal pumps.

3. The method according to claim 1, wherein the discharging of the finely cloudy phase takes place by at least one pipe connected in front of one of the centripetal pumps for discharging the finely cloudy phase, which at least one pipe has at least one throttling point.

4. The method according to claim 3, wherein the at least one throttling point is constructed as a nozzle.

5. The method according to claim 4, wherein the nozzle is one or both of exchangeable and adjustable.

6. The method according to claim 1, wherein a quantity of the finely cloudy phase added to the clear phase is regulatable.

7. The method according to claim 1, wherein the discharging of the finely cloudy phase takes place at an outside diameter of a disk stack in the centrifugal drum.

8. The method according to claim 1, wherein the discharging of the finely cloudy phase takes place adjacent to an outside diameter of a disk stack in the centrifugal drum.

9. The method according to claim 1, wherein the starting product is a preclarified beer and the finely cloudy phase is a finely cloudy beer.

10. The method of claim 1, wherein the centrifuge is a disk separator.

* * * * *